J. R. MITCHELL.
FRICTION SHOCK ABSORBING MECHANISM.
APPLICATION FILED APR. 3, 1919.
1,355,994. Patented Oct. 19, 1920.
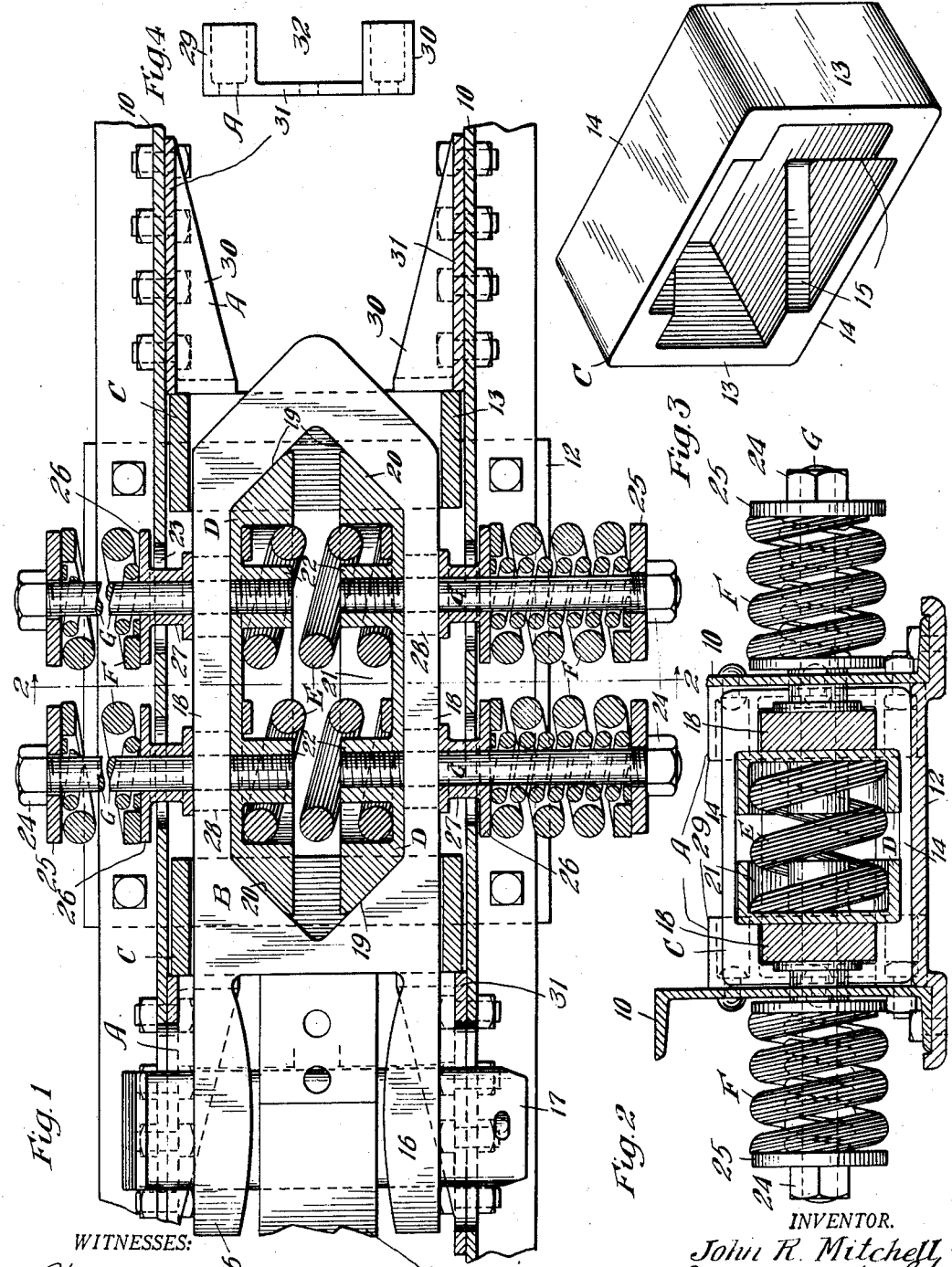
INVENTOR.
John R. Mitchell,
BY George J. Haight
his ATTORNEY.
WITNESSES:

UNITED STATES PATENT OFFICE.

JOHN R. MITCHELL, OF EVANSTON, ILLINOIS, ASSIGNOR TO WILLIAM H. MINER, OF CHAZY, NEW YORK.

FRICTION SHOCK-ABSORBING MECHANISM.

1,355,994.  Specification of Letters Patent.  Patented Oct. 19, 1920.

Application filed April 3, 1919. Serial No. 287,229.

*To all whom it may concern:*

Be it known that I, JOHN R. MITCHELL, a citizen of the United States, residing at Evanston, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft riggings, wherein is obtained high capacity and efficient operation.

In the drawing forming a part of this specification, Figure 1 is a horizontal, sectional view of a portion of a railway draft rigging showing my improvements in connection therewith. Fig. 2 is a vertical, transverse, sectional view taken substantially on the line 2—2 of Fig. 1. Fig. 3 is a detail perspective of one of the end followers. And Fig. 4 is an end, elevational view of one of the stop lugs.

In said drawing, 10—10 denotes channel-shaped center or draft sills of a car underframe, to the inner faces of which are applied front and rear stop lugs designated generally by the reference A and described in detail hereinafter. The draw-bar is designated at 11 and the yoke, which is of special form, is indicated at B. The other parts of the mechanism, as shown, comprise end followers C—C, inner friction elements D—D, interior springs E—E, outer springs F—F, and transversely extending bolts G—G. All the parts are, or may be, supported by a detachable saddle plate indicated at 12.

Each follower C, as shown most clearly in Fig. 3, is of hollow, substantially rectangular form and has vertical side walls 13—13 and upper and lower horizontal walls 14—14. On the inner side of each horizontal wall 14 is provided a pair of oppositely disposed, converging friction wedge faces 15—15, the function of which will be explained hereinafter.

The yoke B, as shown, is preferably in the form of a casting and is provided at its forward end with arms 16—16, which are slotted so as to receive a coupler key 17. Rearwardly of the butt of the draw-bar, the yoke B is furnished with side arms 18—18 and on its inner side is provided, at each end thereof, with a set of converging wedge faces 19—19, which, when the parts are in normal position, aline vertically with the wedge faces 15—15 of the end followers.

The friction shoes D on the interior of the yoke are formed at their ends with friction wedge faces, as indicated at 20—20, adapted to coöperate with the wedge faces 19 and 15 of the yoke and followers. The shoes D are normally separated, as shown in Fig. 1 and Fig. 2 and the springs E are interposed therebetween, the shoes D being recessed or cut out, as indicated at 21—21, so as to form suitable seats or pockets for the springs E. Each of the shoes D is also provided, on its interior, with a pair of inwardly-extended bosses 22 forming lugs over which the ends of the springs E are seated. Said bosses 22 are interiorly threaded so as to have attached thereto the inner ends of the four transversely-extended bolts G, two of said bolts G being placed on each side of the mechanism and extending through suitable elongated openings 23 in the draft sills. At their outer ends the bolts G are provided with nuts 24 and washers 25, the latter bearing against the outer ends of the springs F, as clearly shown in the drawing. The inner ends of the springs F bear against washers or followers 26, the latter in turn being provided with sleeves 27 slidably mounted on the bolts G and extending through the slots 23 and bearing at their inner ends against the sides of the arms 18 of the yoke B. As shown most clearly in Fig. 1, the arms 18 of the yoke are provided with elongated slots, as indicated at 28, to accommodate the bolts G and permit relative, longitudinal movement between the bolts G and the yoke B.

Each of the stop lugs A, as most clearly shown in Fig. 4, is formed in an upper section 29 and a lower section 30. The upper section 29 is preferably provided with a flange 31 so as to provide greater riveting or bolting area when the stop lugs are secured to the sills. The upper and lower shoulders of each stop lug are vertically spaced so as to leave a channel or guideway 32 to accommodate the longitudinal movements of the yoke B.

The parts are assembled as follows: The upper sections 29 of the stop lugs are first secured in place on the sills. The friction shoes D are then assembled with the springs E and the shoes D and springs E next inserted within the yoke B. The followers C are then slipped over the yoke endwise and the parts thus assembled inserted vertically between the stop lugs A, after which the lower sections 30 of the stop lugs are applied and then the saddle plate 12. Thereafter, the bolts are applied from the outer sides of the sills and threaded to the shoes D—it being understood that the springs F and washers 25 and 26 are placed upon the bolts G before the latter are threaded to the shoes D.

The operation is as follows: Upon inward movement of the draw-bar, the yoke B and front follower C move inwardly, thus forcing the shoes D against the wedge faces 15 of the rear follower C. By this action, shoes D are squeezed together at their rear end and will be simultaneously squeezed together at their front ends, due to the action of the wedge faces 19 of the yoke and the wedge faces 15 of the front follower. As the shoes D are forced toward each other, it is evident that the springs E will be compressed directly by the shoes D and simultaneously the springs F will be compressed, due to the bolts G being pulled inwardly in unison with the shoes D. During this action, it is evident that the bolts G, with the springs and washers carried thereby, will move longitudinally to a slight extent and relative movement between the bolts G and the yoke will also occur. The action under draft will be understood from the preceding description of the action under buff and need not be detailed.

I claim:

1. In a friction shock absorbing mechanism, the combination with end followers relatively movable toward and from each other, of a longitudinally movable actuating member, said followers and member having alined, oppositely arranged, wedge faces when the parts are in normal position, friction elements having wedge shaped ends coöperable with the wedge faces of the followers and said member, said elements moving transversely toward each other upon longitudinal movement of said actuating member, and spring means operatively associated with said elements and compressible upon movement of said elements toward each other.

2. In a friction shock absorbing mechanism, the combination with end followers relatively movable toward and from each other, of a longitudinally movable actuating member, said followers and member having alined, oppositely arranged, wedge faces when the parts are in normal position, friction elements having wedge shaped ends coöperable with the wedge faces of the followers and said member, said elements moving transversely toward each other upon longitudinal movement of said actuating member, and springs disposed outside of said member and operatively connected with said friction elements.

3. In a friction shock absorbing mechanism, the combination with end followers relatively movable toward and from each other, of a longitudinally movable actuating member, said followers and member having alined, oppositely arranged, wedge faces when the parts are in normal position, friction elements having wedge shaped ends coöperable with the wedge faces of the followers and said member, said elements moving transversely toward each other upon longitudinal movement of said actuating member, and spring means interposed between said friction elements.

4. In a friction shock absorbing mechanism, the combination with end followers relatively movable toward and from each other, of a longitudinally movable actuating member, said followers and member having alined, oppositely arranged, wedge faces when the parts are in normal position, friction elements having wedge shaped ends coöperable with the wedge faces of the followers and said member, said elements moving transversely toward each other upon longitudinal movement of said actuating member, springs interposed between said elements, and springs located outside of said member and operatively connected with said elements.

5. In a railway draft rigging, the combination with draft sills having stop-acting means, of a draw-bar, a yoke having interior wedge faces, end followers having also interior wedge faces, friction elements within said yoke and having wedge faces coöperable with the wedge faces of the yoke and followers, and spring means coöperable with said elements.

6. In a railway draft rigging, the combination with draft sills, stop-acting means, and a draw-bar, of a yoke operatively connected with the draw-bar, front and rear followers, said followers and yoke having vertically alined friction wedge faces, normally separated friction shoes within said yoke and having wedge-shaped ends coöperable with the wedge faces of the yoke and followers, and laterally-extending springs connected with said friction shoes and adapted to be compressed upon relative approach of said shoes.

7. In a railway draft rigging, the combination with draft sills and stop-acting means, of a yoke, followers, friction shoes within the yoke, coöperating means on said followers, yoke and shoes to effect relative approach of said shoes upon longitudinal movement of the yoke, transversely-extending springs on the outer sides of the sills, and means interposed between said springs and the shoes for effecting compression of said springs upon relative approach of the shoes.

8. In a draft rigging for railway cars, the combination with draft sills having stop-acting means, of hollow, substantially rectangular end followers, each having interior wedge faces, a yoke extending through said followers and having also interior wedge faces normally disposed in alinement with the wedge faces of the followers, friction shoes within the yoke having end wedge faces coöperable with the wedge faces of the shoes and yoke, transversely-extending springs disposed on the outer sides of the sills, and bolts operatively associated with said springs and secured at their inner ends to said shoes.

In witness that I claim the foregoing I have hereunto subscribed my name this 18th day of Mar., 1919.

JOHN R. MITCHELL.